United States Patent [19]

Wagner

[11] 4,436,847

[45] Mar. 13, 1984

[54] RUBBER COMPOSITIONS

[75] Inventor: Melvin P. Wagner, Barberton, Ohio

[73] Assignee: PPG Industries, Inc., Pittsburgh, Pa.

[21] Appl. No.: 430,108

[22] Filed: Sep. 30, 1982

Related U.S. Application Data

[63] Continuation-in-part of Ser. No. 382,542, May 27, 1982.

[51] Int. Cl.$^3$ .......................... C08K 3/34; C08K 3/30
[52] U.S. Cl. .................................. 523/203; 523/212; 523/213; 524/262; 524/575; 524/766
[58] Field of Search ................ 524/262, 575; 260/766; 523/213, 203, 212

[56] References Cited

U.S. PATENT DOCUMENTS

| | | | |
|---|---|---|---|
| 3,128,196 | 4/1964 | Pierpoint | 106/308 |
| 3,350,345 | 10/1967 | Vanderbilt et al. | 260/41.5 |
| 3,737,334 | 6/1973 | Doran et al. | 106/288 Q |
| 3,768,537 | 10/1973 | Hess et al. | 152/330 |
| 3,873,489 | 3/1975 | Thurn et al. | 260/33.6 AQ |
| 3,881,536 | 5/1975 | Doran et al. | 152/330 |
| 3,884,285 | 5/1975 | Russell et al. | 152/330 R |
| 4,002,594 | 1/1977 | Fetterman | 260/42.37 |
| 4,143,027 | 3/1979 | Sollman et al. | 260/42.15 |
| 4,297,145 | 10/1981 | Wolff et al. | 106/308 |

FOREIGN PATENT DOCUMENTS 25840 4/1981 European Pat. Off. .
2528134 1/1976 Fed. Rep. of Germany .

*Primary Examiner*—Melvyn I. Marquis
*Assistant Examiner*—Herbert J. Lilling
*Attorney, Agent, or Firm*—Irwin M. Stein

[57] ABSTRACT

The abrasion resistance of siliceous filler-reinforced rubber vulcanizates is improved by adding to the unvulcanized rubber composition a silane coupling composition comprising a mixture of a silane coupling agent, such as (a) organic silane compounds containing an internal active olefinic linkage,
(b) bis(alkoxysilylalkyl)polysulfides,
(c) haloalkylsilanes, and
(d) silane compounds containing a vinyl functional group in the organofunctional portion of the compound, and an alkyl alkoxysilane, such as methyltrimethoxysilane. The silane coupling agent is present in coupling amounts, e.g., between 0.1 and 50 parts per hundred parts of rubber, and the weight ratio of mercaptosilane to alkyl alkoxysilane is between 0.15:1 and 15:1. Preferably, the silanes are in a ratio of about 1:1, are admixed with a hydrocarbon process oil and the oil-silane mixture added to the siliceous filler-rubber mixture.

16 Claims, No Drawings

RUBBER COMPOSITIONS

CROSS REFERENCE TO RELATED APPLICATIONS

This application is a continuation-in-part application of my application Ser. No. 382,542, filed May 27, 1982 for RUBBER COMPOSITIONS.

DESCRIPTION OF THE INVENTION

It is conventional in the rubber industry to incorporate reinforcing pigments as fillers into natural and synthetic rubber to increase the physical properties of the rubber vulcanizate. Principal among the reinforcing pigments used today are the various carbon blacks. One of the principal non-black fillers used in the rubber industry is siliceous pigment, e.g., finely-divided hydrated silicas and silicates. These siliceous pigments are used to impart improved tensile strength, tear resistance and abrasion resistance to the rubber vulcanizate. Hydrated siliceous pigments are also used in combination with carbon blacks to obtain maximum mileage in off-the-road tires, e.g., tires for mining and logging operations and for road-building equipment. Such applications have become well established. However, when used as the sole reinforcing filler, siliceous pigments do not provide the overall improved performance obtained by the use of carbon blacks. This is observed most readily in rubber vulcanizates used for tires, e.g., tire treads.

Various silane coupling agents have been suggested for use with siliceous pigment when such fillers are incorporated into rubber in order to improve the performance of the rubber vulcanizate. Among the various organosilane coupling agents suggested for such use are the mercaptoalkyltrialkoxysilanes, e.g., mercaptopropyltrimethoxysilane. It has been reported that the use of appropriate amounts of such coupling agents, particularly mercaptopropyl trimethoxysilane, in siliceous filler-reinforced synthetic rubbers provides at least equivalent performance to carbon black-reinforced synthetic rubbers in several key physical properties such as 300% modulus, tensile strength abrasion resistance, and heat build-up.

Other silane coupling agents suggested for use with siliceous pigment reinforced rubber compositions are (a) silane compounds containing an active olefinic linkage having an internal double bond (U.S. Pat. No. 3,737,334), (b) bis(alkoxysilylalkyl)polysulfides (U.S. Pat. No. 3,873,489), (c) haloalkylsilanes (U.S. Pat. No. 4,297,145), and (d) silane compounds containing vinyl functionality in the organofunctional groups.

The high cost of mercaptoalkyltrialkoxysilane and the other described silane coupling agents has deterred the more general use of siliceous fillers as the principal reinforcing pigment in large volume rubber applications.

The present invention is directed to increasing the efficiency of silane coupling agents, particularly mercaptosilane coupling agents, by using an alkoxysilane in combination with the silane. Utilization of the present invention permits the preparation of siliceous filler-reinforced rubber vulcanizates at a lower cost for equivalent performance. Conversely, significantly improved performance in such areas, as for example abrasion resistance, can be obtained at the same cost by utilizing the present invention.

DESCRIPTION OF THE INVENTION

In accordance with the present invention, a curable rubber composition comprising a curable rubber, finely-divided reinforcing siliceous pigment and silane coupling composition is prepared. The silane coupling composition of the present invention comprises a mixture of a silane coupling agent and an alkoxysilane. In the embodiment wherein the silane coupling agent is a mercaptosilane, the silane coupling composition comprises a mixture of mercaptosilane having the graphic formula,

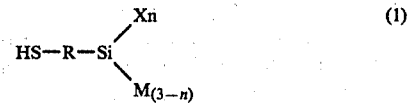

(1)

and alkoxysilane of the graphic formula,

(2)

wherein X is halogen or —OR', M is hydrogen, $C_1$–$C_{10}$ alkyl, or halosubstituted $C_1$–$C_{10}$ alkyl, R is $C_1$–$C_4$ alkylene, R' is selected from $C_1$–$C_{10}$ alkyl or alkoxyalkyl containing from 2 to 10 carbon atoms, R" is $C_1$–$C_{10}$ alkyl, and n is 1, 2 or 3. In the above formulae, the halogen portion of the silane can be selected from the group consisting of chlorine, bromine, iodine, and fluorine, preferably chlorine. R is preferably $C_1$–$C_3$ alkylene e.g., methylene, ethylene, and propylene, R' and R" are preferably $C_1$–$C_4$ alkyl, more preferably methyl and ethyl, X is preferably —OR', and n is preferably 3.

As examples of mercaptosilanes within the scope of the above graphic formula (1), there can be mentioned mercaptomethyltrimethoxysilane, metcaptoethyltrimethoxysilane, mercaptopropyltrimethoxysilane, mercaptomethyltriethoxysilane, mercaptoethyltripropoxysilane, and mercaptopropyltriethoxysilane.

As Examples of alkoxysilanes within the scope of the above graphic formula (2), there can be mentioned methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane and propyltripropoxysilane.

Silane coupling agents that can be used in place of the abovedescribed mercaptosilanes include those silane compounds useful for improving the bond between a siliceous pigment and the curable rubber, e.g., a sulfur curable rubber. That is, the coupling agent forms a bridge between the rubber and siliceous pigment. As exemplifications of the aforesaid silane coupling agents, there can be mentioned (a) organic silane compounds containing an active olefinic linkage having an internal double bond, (b) bis(alkoxysilylalkyl)polysulfides, (c) haloalkylsilanes such as haloalkyl alkoxysilanes and (d) silane compounds containing a vinyl functional group in the organofunctional portion of the silane compound.

Organic silane compounds containing an internal active olefinic linkage are described in U.S. Pat. No. 3,737,334. The term "active olefinic linkage" is intended to mean an internal double bond, i.e., a carbon-carbon double bond in which the carbon atoms of the bond are other than terminal carbons. Such an olefinic linkage is more reactive than the olefinic linkage of, for example, ethylene. The reactivity of the internal olefinic linkage should compare favorably with the reactivity of the olefinic linkage in the curable rubber polymer. The more active the olefinic linkage of the silane coupling agent, the more effective is the coupling agent.

Several factors affect the activity of the olefinic linkage of the coupling agent. For example, with open-chain olefins, the amount of substitution on the carbon atoms of the double bond is of importance. Preferably, such carbon atoms each have at least one methyl group attached thereto. Although the hydrogen atoms themselves may not enter into the reaction, yet the greater the number of allylic hydrogens, the more active will be the olefinic linkage. Certain cyclic olefins provide more active olefinic linkages than do open-chain olefins. The olefinic linkage is especially active if the double bond suffers angle strain such as in a norbornene or cyclobutene. This degree of strain can be measured as in the work of R. B. Turner, W. R. Meador and R. E. Winkler, Journal of the American Chemical Society, vol. 79, page 4116 (1957). In any event, the activity of the olefinic linkage of the coupling agent must be sufficiently great to result in a bonding between the coupling agent and the rubber polymer upon vulcanization. When the coupling agent is reacted with the rubber polymer, one bond of the double bond breaks such that the carbon atom bonds directly with the rubber polymer.

The following graphic formulae exemplify compounds which provide a reactive olefinic linkage:

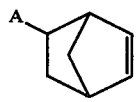 (3)

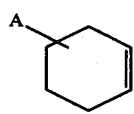 (4)

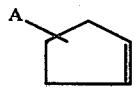 (5)

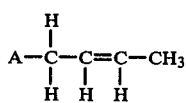 (6)

wherein A is

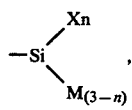

and X, M and n are as defined in connection with graphic formula (1). Formulae (3)–(6) depict A-substituted-norbornene, -cyclohexene, -cyclopentene and -2-butene. In addition to 2-butene, there can also be used A-substituted 2-methyl-2-butene, 3-methyl-2-butene, and 2,3-dimethyl-2-butene. In preferred embodiments, A is the trimethoxysilyl, triethoxysilyl, trimethoxyethylsilyl, or triethoxyethylsilyl group.

Other compounds containing a reactive olefinic linkage can be represented by the following graphic formula:

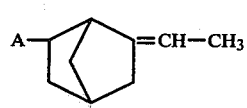 (7)

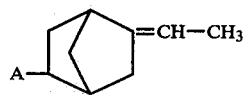 (8)

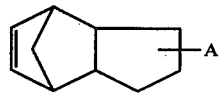 (9)

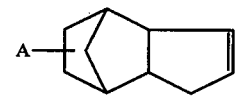 (10)

wherein A is as defined hereinabove. Formulae (7) and (8) depict A-substituted ethylidene norbornane compounds, while formulae (9) and (10) depict A-substituted dicyclopentadiene compounds. Compounds containing a reactive internal olefinic linkage can also be represented by the designation, A-B, wherein A is as defined and B is the organofunctional portion of the molecule containing the olefinic linkage, i.e., norbornenyl, cyclohexenyl, cyclopentenyl, 2-butenyl, isoprenyl, ethylidene norbornanyl, dicyclopentadienyl, etc.

As examples of compounds containing a reactive internal olefinic linkage, there can be mentioned, 5-triethoxysilyl-norbornene, isoprenetriethoxysilane adduct, 4(triethoxysilylethyl)cyclohexene, 6-triethoxysilyl-2-ethylidene norbornane, 5-triethoxysilyl-2-ethylidene norbornane, and triethoxysilyl dicyclopentadiene.

Bis(alkoxysilylalkyl)polysulfides are described in U.S. Pat. No. 3,873,489 and are represented by the graphic formula:

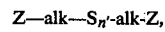

Z—alk—S$_{n'}$-alk-Z, in which alk is a divalent hydrocarbon radical having from 1 to 18, preferably 1 to 6 more preferably, 2 to 3, carbon atoms; n' is a whole number of 2 to 6, preferably 2 to 4 and more preferably 3 to 4; and Z is:

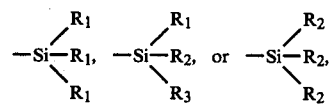

wherein $R_1$ is an alkyl group having from 1 to 4 carbon atoms or phenyl, and $R_2$ is an alkoxy group having from 1 to 8, preferably 1 to 4, more preferably 1 to 2, carbon atoms, cycloalkoxy with from 5 to 8 carbon atoms, or a straight or branched chain alkylmercapto group with from 1 to 8 carbon atoms. The $R_1$ and $R_2$ groups can be the same or different. The divalent alk group can be straight or branched chain, a saturated or unsaturated aliphatic hydrocarbon group or a cyclic hydrocarbon group.

Exemplification of the bis(alkoxysilylalkyl)polysulfides include: the bis(2-trialkoxysilylethyl)polysulfide in which the trialkoxy group is trimethoxy, triethoxy, tri(methylethoxy), tripropoxy, tributoxy, etc. up to trioctyloxy and the polysulfide is the di-, tri-, tetra-, penta-, and hexasulfide. The corresponding bis(3-trialkoxysilylpropyl)-, bis(3-trialkoxysilylisobutyl), -bis(4-trialkoxysilylbutyl)-, etc. up to bis(6-trialkoxysilylhexyl)polysulfide can also be used. Preferred are the relatively simply constructed organosilanes including the bis(3-trimethoxy-, -triethoxy-, and -tripropoxysilylpropyl)polysulfide; namely, the di-tri- and tetrasulfides.

Specific examples of such bis(alkoxysilylalkyl)polysulfides are described in column 6, lines 5-55 of the aforesaid U.S. Pat. No. 3,873,489, which disclosure is incorporated herein by reference. Representative examples of such compounds are: 3,3'bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, and 3,3'-bis(trioctoxysilylpropyl)tetrasulfide.

Halogen alkylsilanes are described in U.S. Pat. No. 4,297,145. They can be represented by the graphic formula:

$$X_p-C_mH_{2m+1-p}A,$$

wherein X is a halogen, e.g., fluorine or iodine but preferably chlorine or bromine, p is the number 1 or 2, m is the number 1 to 5, and A is as defined above.

Examples of the aforesaid halosubstituted $C_1$–$C_5$ alkyl silanes, particularly the alkoxysilanes, are described in column 3, lines 10-65 and such disclosure is incorporated herein by reference. They include: chloromethyl trimethoxysilane, chloromethyl triethoxysilane, bromomethyl triethoxysilane, dichloromethyl triethoxysilane, 1-chloro-1-methyl methyl trimethoxy silane, 2-chloroethyl trimethoxy silane, 2-bromoethyl trimethoxy silane, and 3-chloropropyl triethoxysilane.

Silane compounds containing a vinyl functional group can be represented by the graphic formula:

$$R_1-A$$

wherein $R_1$ is a $C_2$–$C_8$ alkenyl group or an alkenylcarboxyalkyl of 4-10 carbon atoms, and A is as defined above. Preferably, $R_1$ is a $C_2$–$C_3$ alkenyl or alkenylcarboxyalkyl of from 4-7 carbon atoms, and A is a trialkoxysilyl group.

Examples of vinyl-containing silanes, e.g., vinyl-containing alkoxysilanes include: vinyltrimethoxysilane, vinyl triethoxysilane, vinyltris($\beta$-methoxyethoxy)silane, allyltriethoxysilane, and gamma-methacryloxypropyl trimethoxysilane.

The silane coupling agent of the silane coupling composition is added to the curable rubber composition in amounts which will vary depending on the silane coupling agent used; but will be used in amounts sufficient to bind the siliceous pigment to the curable rubber, i.e., a coupling amount. For example, from about 0.1 to 50 parts by weight, more usually from 0.5 to 25 parts, per 100 parts of rubber of the bis(alkoxysilylalkyl) polysulfides can be added to the rubber mixture. Mercaptosilanes are added in amounts of between 0.3 and 15 parts, preferably, between 0.3 and 4.5 parts, per hundred parts of rubber. In a more preferred embodiment, at least 0.75 parts more preferably at least 1.0 part, of the mercaptosilane coupling agent, per 100 parts of rubber, is present in the rubber composition. Haloalkylsilanes and vinyl-containing silanes can be added in amounts of from 0.2 to about 30 parts per 100 parts of rubber.

The weight ratio of silane coupling agent to alkoxysilane typically ranges between 0.15:1 and 15:1, preferably between 0.6:1 and 6:1, and, more preferably, about 1:1.

The silane coupling compositions can be added to the rubber compound in any convenient manner. For example, it can be added separately but simultaneously with the siliceous filler and other additives during conventional mixing of the rubber compound in a Banbury mixer or on the rubber mill. The coupling agent can be in any one of several forms when it is so mixed with the rubber. For example, it can be added in an undiluted stage, dissolved in an organic solvent, e.g., benzene or xylene, or dissolved or suspended in water or a processing oil commonly used in the rubber compound. Preferably, the silane coupling agent is dispersed in a processing oil compatible with the rubber compound. The silane coupling composition-oil mixture is then added to the rubber compound or rubber composition.

Typical of rubber process oils are the paraffinic, naphthenic, or aromatic hydrocarbon fractions defined by the American Society of Testing Materials (ASTM) designation D-2226. An example of such process oil is Circo Light Rubber Process Oil, a product of Sun Oil Company. The amount of process oil used will depend on the end use of the vulcanized rubber composition and typically varies from about 5 to 50 parts of process oil per hundred parts of rubber.

In a preferred embodiment, the silane coupling composition is admixed with the siliceous filler and the curable rubber prior to incorporation of polar additives, particularly soaps, metal oxides, e.g., zinc oxide, amines, glycols, and accelerators, e.g., guanidine, into the vulcanizable rubber mixture.

In a further embodiment of the present invention, the silane coupling composition is blended first with the siliceous filler and the silane coupling composition-siliceous filler blend is incorporated into the rubber compound or the mixture of rubber compound and other conventional additives, e.g., the polar additives described above. Blending of the siliceous filler and silane coupling composition can be achieved in the customary manner with the help of conventional mixing means, e.g., a rubber mill or Banbury mixer. The silane coupling composition is thereby homogeneously and more uniformly distributed on the surface of the siliceous filler. In this manner, the silane coupling composition can be more rapidly incorporated into the vulcanizable rubber composition.

In a still further embodiment of the present invention, the silane coupling composition can be formulated with the siliceous filler to prepare a rubber compounding additive, i.e., a silica-silane concentrate. The concentrate has the advantage that it can be handled as a free-flowing, substantially dry powder product which can be added to the vulcanizable rubber composition in amounts required to introduce the desired quantity of silane coupling composition. The concentrate can be prepared by admixing the siliceous filler and silane coupling composition alone or by mixing the siliceous filler with a dispersion of the silane coupling composition in the aforedescribed processing oil, water, hydrocarbon solvent, e.g., benzene, or xylene, or other suitable non-reactive liquid that is chemically inert with respect to the coupling composition and siliceous pigment.

Blending of the siliceous pigment and silane coupling composition can be accomplished by mixing the two for between 1 and 120 minutes until the coupling composition or dispersion of coupling composition is adsorbed on the pigment. The concentrate can comprise from about 25 to about 75 weight percent of the silane coupling composition with from about 75 to about 25 weight percent siliceous filler. As siliceous fillers have a high capacity for adsorbing liquids, a significant quantity of silane coupling composition and/or dispersing liquid medium can be adsorbed onto the siliceous filler before it becomes non-free flowing. A typical dry, flowable, powdered concentrate will comprise about 30 weight percent siliceous filler and about 70 weight percent of the silane coupling composition dispersed in a rubber process oil. The amount of siliceous filler added to the vulcanizable rubber composition with the concentrate additive is taken into account in calculating the total amount of siliceous filler which is to be added to the rubber composition.

Siliceous fillers (referred to herein also as siliceous pigment or silica pigment) that can be used include, for example, silicates and both pyrogenic and precipitated finely-divided silicas of the type commonly employed for compounding with rubber. Such highly dispersed silicas (silicon dioxide) have a BET surface area in the range of between about 40 and about 600, more usually 50 to 300 square meters per gram and have an ultimate particle size in the range of from 5 to 100 nanometers (50 to 1000 angstroms), preferably between 5 and 40 and, more preferably, between 15 and 30 nanometers.

Such silica fillers can be produced, for example, by precipitation from solutions of silicates, e.g., sodium silicate, by hydrolysis and/or oxidative high temperature conversion. There can also be used flame hydrolysis of volatile silicon halides, e.g., silicon tetrachloride, or by electric arc processes. These silicas, in a given case, can also be present as mixed oxides or oxide mixtures with oxides of the metals aluminum (alumina), magnesium, (magnesium oxide), calcium (calcium oxide), barium (barium oxide), zinc (zinc oxide), zirconium (zirconium oxide), or titanium (titanium dioxide).

Synthetic silicates include, for example, aluminum silicate or alkaline earth silicates, such as magnesium or calcium silicates with specific surface areas of from about 20 to 400 square meters per gram and primary particle sizes of from about 10 to 400 nanometer (nm).

The siliceous filler is preferably of the type obtained by precipitation from a soluble silicate, e.g., sodium silicate. For example, siliceous pigment produced according to the method described in U.S. Pat. No. 2,940,830 can be used. These precipitated amorphous hydrated silica pigments have an $SiO_2$ content of at least 80 or 85, preferably at least 90, more preferably 93–97 percent by weight on an anhydrous basis, i.e., including bound water. A typical commercial form of such reinforcing siliceous pigment is manufactured and sold by PPG Industries, Inc., under the trademark, Hi-Sil ®233.

The amount of siliceous filler used as the reinforcing filler in the rubber compositions described herein can vary widely. Generally between about 10 and about 90 parts of siliceous filler per 100 parts of total rubber are used. More typically, between about 30 and 75 parts of siliceous filler per 100 parts of rubber are used. On the average, 50 to 65 parts of siliceous filler per 100 parts of rubber is found most desirable.

The silane coupling composition of the present invention can be used in vulcanizable rubber compositions in which improvement in the aforementioned physical properties is desired. Principally, the present invention contemplates the use of the herein described silane coupling compositions for mechanical rubber goods such as belting, hoses, motor mounts, tires and other rubber applications where abrasion resistance or rigidity are desired. Vulcanized rubber compositions incorporating the silane coupling composition of the present invention are especially contemplated for use in tire treads, for pneumatic tires and other types of tires.

Curable rubbers principally contemplated for use in combination with the silane coupling agent of the present invention are well known to the skilled artisan in rubber chemistry and include the sulfur-curable rubbers. Particularly contemplated are those which are typically used for mechanical rubber goods. As examples of such rubbers there can be mentioned natural rubber, styrene-butadiene rubber (40–95 percent butadiene and 5–60 percent styrene), polybutadiene, ethylene-propylene-diene (EPDM) rubbers, polyisoprene, butadiene-acrylonitrile copolymers and polychloroprene. Mixtures of such synthetic rubbers with natural rubber are also contemplated.

The silane coupling composition, silane coupling composition-siliceous filler blend or concentrate can be mixed with the uncured rubbery elastomer used to prepare the vulcanizable rubber composition by conventional means such as in a Banbury mixer or on a rubber mill at temperatures between about 100° F. and 300° F. (38° C.–150° C.). A typical vulcanizable rubber composition will contain, based on 100 parts of vulcanizable rubber polymer, from 30 to 75 parts of siliceous filler, between 0.3 and 4.5 parts of mercaptosilane, and an equal amount by weight of alkoxysilane (basis the mercaptosilane). Other conventional rubber additives present are the conventional sulfur or peroxide cure systems.

The sulfur-cure system can include 0.5 to 3 parts sulfur, 2 to 5 parts zinc oxide and 0.5 to 2 parts accelerator. The peroxide-cure system can include 1 to 4 parts of a peroxide such as dicumyl peroxide. Other conventional rubber additives can also be used. Such additives include other fillers, such as carbon black, oils, plasticizers, accelerators (guanidines), antioxidants, heat stabilizers, light stabilizers, zone stabilizers, organic acids such as for example stearic acid, benzoic acid, or salicylic acid, other activators, extenders and coloring pigments. The particular compounding recipe will vary with the particular vulcanizate prepared; but, such recipes are well-known to those skilled in the rubber compounding art.

The vulcanizable rubber composition is vulcanized or cured to a rubber vulcanizate in accordance with customary procedures known in the rubber industry. Exemplification of industrial rubber vulcanizates (articles) which can be produced utilizing the silane coupling agent of the present invention include cable insulation, hoses, driving belts, V-belts, conveyor belts, roller coatings, vehicle tire treads, subtreads, tire carcasses, tire sidewalls, cross country tires, shoe sole materials, packing rings, damping elements and many others.

The present invention is more particularly described in the following examples which are intended as illustrative only since numerous modifications and variations therein will be apparent to those skilled in the art. All parts and percentages in said examples are by weight unless otherwise indicated.

EXAMPLE I

A series of rubber compositions were prepared by mixing the ingredients in Table I in a Banbury mixer for about 6-8 minutes at a temperature of about 150° C. The amount of mercaptopropyltrimethoxysilane and methyltrimethoxysilane added to the rubber composition were varied in the compositions prepared and such amounts are found in Table III. When a combination of mercaptopropyltrimethoxysilane and methyltrimethoxysilane was added to the rubber composition, the silanes were premixed with the process oil prior to their addition to the Banbury mixer. The silanes were added to the Banbury mixer along with the first half of the silica filler added to the mixer.

The ingredients in Table II were added to the mixture removed from the Banbury mixer on an open rubber mill. The resulting rubber compositions were cured at 150° C. for a time sufficient to reach 90% of the maximum torque obtained using the oscillating Disk Rheometer (90% ODR).

The resulting vulcanizates were tested for various physical properties in accordance with standard ASTM procedures. The amounts of the variable ingredients and appropriate test results are reported in Table III.

TABLE I

| Ingredients | Parts By Weight |
|---|---|
| Styrene-Butadiene Rubber[1] | 100 |
| Hi Sil ® 233 Silica Filler | 60 |
| Mercaptopropyltrimethoxysilane (MPS) | Variable |
| Methyltrimethoxysilane (MTMS) | Variable |
| Process Oil[2] | 10 |
| Stearic Acid | 1 |
| Agerite Resin D[3] Antioxidant | 1 |

[1]SBR-1502 (cold polymerized styrene - butadiene rubber containing 25% styrene).
[2]Circo Light Process Oil.
[3]A polymerized 1,2-dihydro-2,2,4-trimethyl-quinoline.

TABLE II

| Ingredients | Parts By Weight |
|---|---|
| Zinc Oxide | 4 |
| Sulfur | 2.5 |
| Santocure[1] Accelerator | 1.0 |
| TMTD[2] | 0.75 |

[1]N—cyclohexyl-2-benzothiazolesulfenamide.
[2]Tetramethylthiuram disulfide.

TABLE III

| | RUN NO. | | | | | | | | | | |
|---|---|---|---|---|---|---|---|---|---|---|---|
| | 1 | 2 | 3 | 4 | 5 | 6 | 7 | 8 | 9 | 10 | 11 |
| SILANE | | | | | | | | | | | |
| MPS | 1.5 | 2.21 | 0.06 | 0.75 | 1.5 | 0.75 | 0.36 | 0 | 0.37 | 0 | 0.75[a] |
| MTMS | 0 | 0.36 | 0.37 | 0.75 | 1.5 | 0.75 | 2.21 | 1.5 | 0.06 | 0 | 0.75 |
| PROCESS DATA | | | | | | | | | | | |
| ML4-100[1] | 83 | 90 | 128 | 96 | 99 | 97 | 103 | 128 | 122 | 153 | 103 |
| 90% ODR[2], min. (150° C.) | 29 | >40 | >60 | >40 | 15 | >40 | 16 | >60 | >60 | >60 | 16 |
| TEST DATA | | | | | | | | | | | |
| 300% Modulus[3], psi | 1120 | 1630 | 1230 | 1030 | 2170 | 1140 | 1350 | 1180 | 760 | 550 | 1330 |
| Tensile Strength[3], psi | 3560 | 3260 | 3200 | 2990 | 3120 | 3150 | 2810 | 2730 | 3370 | 2980 | 3020 |
| Elongation[3], % | 610 | 450 | 800 | 580 | 380 | 560 | 490 | 720 | 710 | 760 | 520 |
| Hardness | 66 | 65 | 75 | 70 | 67 | 71 | 72 | 72 | 70 | 75 | 74 |
| Pico Abrasion Index[4], % | 90 | 104 | 64 | 88 | 114 | 93 | 85 | 66 | 76 | 65 | 87 |
| Trouser Tear, ppi | 71 | 47 | 198 | 106 | 35 | 90 | 70 | 184 | 139 | 185 | 83 |
| Goodrich Flexometer[5] (0.175 Stroke, 1 MPa, 100° C., 20 min.) | | | | | | | | | | | |
| ΔT, °C. | 38 | 26 | 37 | 32 | 21 | 30 | 25 | 46 | 38 | 44 | 31 |
| Permanent Set, % | 5.9 | 2.6 | 13.2 | 5.3 | 1.9 | 5.1 | 5.2 | 8.8 | 2.4 | 6.5 | 6.5 |
| Water Volume Swell, % (24 hrs./90° C.) | 7.0 | 5.8 | 7.9 | 6.3 | 9.1 | 6.0 | 6.0 | 7.5 | 7.3 | 8.8 | 5.9 |

[1]Tested According to ASTM 01646
[2]Tested According to ASTM D2084
[3]Tested According to ASTM 0412
[4]Tested According to ASTM D2228
[5]Tested According to ASTM D623, Method A
[a]MPS from a different commerical source than in Runs 1-7 and 9.

The data of Table III show that the combination of Mercaptopropyltrimethoxysilane (MPS) and methyltrimethoxysilane (MTS) was more effective than MPS alone, and particularly when at least 0.5 parts of MPS (phr) was present. Significantly higher Pico Abrasion Index was obtained with the combination of MPS and MTMS than with MPS alone. The data also show that substantially equal Pico Abrasion Index was obtained with less MPS when MTMS was also present. The extent of reduction in the ΔT (Flexometer) and Trouser tear also followed the efficient coupling obtained with the combination of MPS and MTMS.

Although the present process has been described with reference to specific details of certain embodiments thereof, it is not intended that such details should be regarded as limitations upon the scope of the invention except as and to the extent that they are included in the accompanying claims.

I claim:

1. In a rubber composition comprising a curable rubber, from 10 to 90 parts, per 100 parts of rubber, of finely divided reinforcing siliceous pigment and a coupling amount of a silane coupling agent, the improvement wherein a silane coupling composition of the silane coupling agent in combination with an alkoxysilane is admixed with said siliceous pigment, said alkoxysilane having the graphic formula:

$$R''-Si-(OR')_3,$$

wherein R' is selected from $C_1$-$C_{10}$ alkyl or alkoxyalkyl containing from 2 to 10 carbon atoms, and R" is a $C_1$–$C_{10}$ alkyl, and the silane coupling agent is chosen from the group consisting of:
  (a) organic silane compounds containing an internal active olefinic linkage,
  (b) bis(alkoxysilylalkyl)polysulfides,
  (c) haloalkylsilanes, and
  (d) silane compounds containing a vinyl functional group in the organofunctional portion of the compound, the weight ratio of the silane coupling agent to alkoxysilane being between 0.15:1 and 15:1.

2. The rubber composition of claim 1 wherein th alkoxysilane is methyltrimethoxysilane.

3. The rubber composition of claims 1 or 2 wherein the ratio of silane coupling agent to alkoxysilane is between 0.6:1 and 6:1.

4. The rubber composition of claims 1 or 2 wherein the silane coupling agent is selected from the group consisting of:
  (a) compounds represented by the designation A-B, wherein A is:

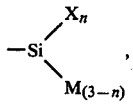

wherein X is halogen or OR', M is hydrogen, $C_1$–$C_{10}$ alkyl, or halosubstituted $C_1$–$C_{10}$ alkyl, R' is $C_1$–$C_{10}$ alkyl or alkoxyalkyl containing from 2 to 10 carbon atoms, and n is 1, 2 or 3, and B is norbornenyl, cyclopentenyl, 2-butenyl, 2-methyl-2-butenyl, 3-methyl-2-butenyl, 2,3-dimethyl-2-butenyl, 2-ethylidene norbornanyl, and dicyclopentadienyl;
  (b) compounds reprsented by the designation,

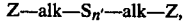

wherein alk is a divalent hydrocarbon radical having from 1 to 18 carbon atoms, n' is a whole number of from 2 to 6, and Z is,

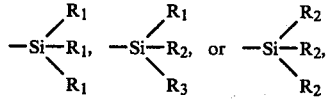

wherein $R_1$ is a $C_1$–$C_4$ alkyl or phenyl group, and $R_2$ is a $C_1$–$C_8$ alkoxy, $C_5$–$C_8$ cycloalkoxy or $C_1$–$C_8$ alkylmercapto group;
  (c) compounds represented by the designation, $X_p$—$C_mH_{2m+1-p}A$, wherein A is as defined above, X is halogen, p is 1 or 2 and m is 1 to 5; and
  (d) compounds represented by the designation, $R_1$-A, wherein A is as defined above and $R_1$ is a $C_2$–$C_8$ alkenyl or an alkenylcarboxyalkyl having from 4 to 10 carbon atoms.

5. The rubber composition of claim 1 wherein the curable rubber is a sulfur-curable rubber.

6. The rubber composition of claim 1 wherein the silane coupling agent and alkoxysilane are added to the rubber composition admixed with a rubber process oil.

7. A vulcanizate prepared from the rubber composition of claims 1 or 2.

8. A vulcanizate prepared from the rubber composition of claim 4.

9. A vulcanizate prepared from the rubber composition of claim 6.

10. A substantially dry, free-flowing rubber compounding additive suitable for incorporation into a vulcanizable rubber composition comprising from about 25 to 75 weight percent of rubber reinforcing finely-divided siliceous pigment and from 75 to 25 weight percent of organic silane coupling composition, said silane coupling composition being applied as a combination of an alkoxysilane of the graphic formula,

wherein R' is selected from $C_1$–$C_{10}$ alkyl or alkoxyalkyl containing from 2 to 10 carbon atoms and R" is a $C_1$–$C_{10}$ alkyl, and an organic silane coupling agent selected from the groups:
  (a) organic silane compounds containing an internal active olefinic linkage,
  (b) bis(alkoxysilylalkyl)polysulfides,
  (c) haloalkylsilanes, and
  (d) silane compounds containing a vinyl functional group in the organofunctional portion of the compound, the weight ratio of the silane coupling agent to alkoxysilane being between 0.15:1 and 15:1.

11. The rubber compounding additive of claim 10 wherein the alkoxysilane is methyltrimethoxysilane.

12. The rubber compounding additive of claims 10 or 11 wherein the silane coupling agent is selected from the group consisting of:
  (a) compounds represented by the designation A-B, wherein A is:

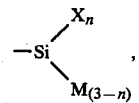

wherein X is halogen or OR', M is hydrogen, $C_1$–$C_{10}$ alkyl, or halosubstituted $C_1$–$C_{10}$ alkyl, R' is $C_1$–$C_{10}$ alkyl or alkoxyalkyl containing from 2 to 10 carbon atoms, and n is 1, 2 or 3, and B is norbornenyl, cyclohexenyl, cyclopentenyl, 2-butenyl, 2-methyl-2-butenyl, 3-methyl-2-butenyl, 2,3-dimethyl-2-butenyl, 2-ethylidene norbornanyl, and dicyclopentadienyl;
  (b) compounds represented by the designation,

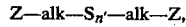

wherein alk is a divalent hydrocarbon radical having from 1 to 18 carbon atoms, n' is a whole number of from 2 to 6, and Z is,

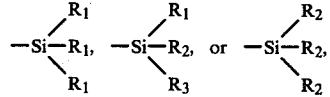

wherein $R_1$ is a $C_1$–$C_4$ alkyl or phenyl group, and $R_2$ is a $C_1$–$C_8$ alkoxy, $C_5$–$C_8$ cycloalkoxy or $C_1$–$C_8$ alkylmercapto group;
  (c) compounds represented by the designation, $X_p$—$C_mH_{2m+1-p}A$, wherein A is as defined above, X is halogen, p is 1 or 2, and m is 1 to 5; and
  (d) compounds represented by the designation, $R_1$-A, wherein A is as defined above and $R_1$ is a $C_2$–$C_8$ alkenyl or an alkenylcarboxyalkyl having from 4 to 10 carbon atoms.

13. The rubber compounding additive of claims 10 or 11 wherein the weight ratio of silane coupling agent to alkoxysilane is from about 0.6:1 to about 6:1.

14. The rubber compounding additive of claims 10 or 11 wherein the rubber process oil is also present and the weight ratio of silane coupling agent to alkoxysilane is about 1:1.

15. The rubber compounding additive of claim 12 wherein the weight ratio of silane coupling agent to alkoxysilane is from about 0.6:1 to about 6:1.

16. The rubber compounding additive of claim 12 wherein the rubber process oil is also present and the weight ratio of silane coupling agent to alkoxysilane is about 1:1.

* * * * *

UNITED STATES PATENT AND TRADEMARK OFFICE
CERTIFICATE OF CORRECTION

PATENT NO. : 4,436,847

DATED : March 13, 1984

INVENTOR(S) : Melvin P. Wagner

It is certified that error appears in the above-identified patent and that said Letters Patent is hereby corrected as shown below:

Claim 2, line 1, "th" should be --the--.

Claim 4, line 11, "nyl, cyclopentenyl, 2-butenyl, 2-methyl-2-butenyl," should be --nyl, cyclohexenyl, cyclopentenyl, 2-butenyl, 2-methyl-2-butenyl,--.

Signed and Sealed this

Twenty-first Day of August 1984

[SEAL]

Attest:

GERALD J. MOSSINGHOFF

Attesting Officer

Commissioner of Patents and Trademarks